(12) United States Patent
Thurow et al.

(10) Patent No.: US 10,666,862 B2
(45) Date of Patent: May 26, 2020

(54) IMAGE STITCHING AND AUTOMATIC-COLOR CORRECTION

(71) Applicant: Searidge Technologies Inc., Ottawa (CA)

(72) Inventors: Christian Tim Thurow, Berlin (DE); Moodie Cheikh, Ottawa (CA); Alexander Sauriol, Ottawa (CA)

(73) Assignee: SEARIDGE TECHNOLOGIES INC., Ottawa (CA)

( * ) Notice: Subject to any disclaimer, the term of this patent is extended or adjusted under 35 U.S.C. 154(b) by 838 days.

(21) Appl. No.: 15/120,574

(22) PCT Filed: Feb. 25, 2015

(86) PCT No.: PCT/CA2015/000114
§ 371 (c)(1),
(2) Date: Aug. 22, 2016

(87) PCT Pub. No.: WO2015/127535
PCT Pub. Date: Sep. 3, 2015

(65) Prior Publication Data
US 2017/0070674 A1    Mar. 9, 2017

Related U.S. Application Data

(60) Provisional application No. 61/944,878, filed on Feb. 26, 2014.

(51) Int. Cl.
*G01C 3/08*    (2006.01)
*H04N 5/232*    (2006.01)
(Continued)

(52) U.S. Cl.
CPC ....... *H04N 5/23238* (2013.01); *G06T 3/0062* (2013.01); *G06T 3/4038* (2013.01);
(Continued)

(58) Field of Classification Search
CPC .. H04N 5/23238; H04N 13/156; H04N 13/15; H04N 13/243; H04N 17/002;
(Continued)

(56) References Cited

U.S. PATENT DOCUMENTS 8,319,823 B2    11/2012    Chen et al.
8,446,433 B1    5/2013    Mallet et al.
(Continued)

FOREIGN PATENT DOCUMENTS

| CN | 101146231 A | 3/2008 |
|---|---|---|
| CN | 103377470 A | 10/2013 |
| WO | 2008114264 A2 | 9/2008 |

OTHER PUBLICATIONS

European Patent Application No. 15754944.5, Extended European Search Report dated Sep. 14, 2017.
(Continued)

*Primary Examiner* — Samantha K Abraham
(74) *Attorney, Agent, or Firm* — Borden Ladner Gervais LLP; Jason Rudy Mueller-Neuhaus

(57) ABSTRACT

Panoramic videos are generated from multiple video feeds in real time received from multiple video cameras, such as an array of video cameras having overlapping fields of view. Texture mapping techniques are employed to correct lens distortion or other defects or deficiencies in the video frames in each of the video feeds caused by optical properties of the corresponding video camera. Video frames of related video feeds, such as the video feeds of cameras in an array of cameras having adjacent and overlapping fields of view, are seamlessly stitched automatically based on an initial manual configuration, again employing texture mapping techniques. A colour profile of the different video frames is normalized to provide a uniform and seamless colour profile of the video panoramic view.

21 Claims, 13 Drawing Sheets

(51) Int. Cl.

| | | |
|---|---|---|
| *H04N 13/15* | (2018.01) | |
| *H04N 13/156* | (2018.01) | |
| *H04N 13/243* | (2018.01) | |
| *H04N 7/18* | (2006.01) | |
| *H04N 5/262* | (2006.01) | |
| *G06T 7/70* | (2017.01) | |
| *G06T 7/13* | (2017.01) | |
| *G06T 7/90* | (2017.01) | |
| *G06T 3/40* | (2006.01) | |
| *G06T 3/00* | (2006.01) | |
| *G06T 5/00* | (2006.01) | |
| *H04N 17/00* | (2006.01) | |
| *H04N 19/597* | (2014.01) | |
| *H04N 19/85* | (2014.01) | |
| *H04N 13/00* | (2018.01) | |

(52) U.S. Cl.
CPC .................. *G06T 5/00* (2013.01); *G06T 7/13* (2017.01); *G06T 7/70* (2017.01); *G06T 7/90* (2017.01); *H04N 5/2622* (2013.01); *H04N 7/181* (2013.01); *H04N 13/15* (2018.05); *H04N 13/156* (2018.05); *H04N 13/243* (2018.05); *H04N 17/002* (2013.01); *H04N 19/597* (2014.11); *H04N 19/85* (2014.11); *H04N 2013/0077* (2013.01); *H04N 2013/0088* (2013.01)

(58) Field of Classification Search
CPC ................. H04N 7/181; H04N 5/2622; H04N 2013/0077; H04N 2013/0088; H04N 19/85; H04N 19/597; G06T 3/4038; G06T 3/0062; G06T 7/90; G06T 7/13; G06T 7/70; G06T 5/00
See application file for complete search history.

(56) References Cited

U.S. PATENT DOCUMENTS

| | | | |
|---|---|---|---|
| 2002/0181802 | A1 | 12/2002 | Peterson |
| 2010/0054592 | A1* | 3/2010 | Nanu ...................... G06T 5/008 382/167 |
| 2012/0223941 | A1 | 9/2012 | Sekine et al. |

OTHER PUBLICATIONS

Foote et al., "Flycam: Practical Panoramic Video and Automatic Camera Control", Multimedia and Expo, 2000. ICME 2000. 2000 IEEE International Conference on Jul. 30-Aug. 2, 2000, vol. 3, pp. 1419-1422.
International Search Report and Written Opinion for PCT Patent Application No. PCT/CA2015/000114, dated May 13, 2015, 9 pages.

* cited by examiner

1

IMAGE STITCHING AND AUTOMATIC-COLOR CORRECTION

FIELD OF THE INVENTION

The present disclosure relates to digital image processing, and in particular to the production of a panoramic video using video feeds from multiple video cameras, in the field of airport monitoring and surveillance.

BACKGROUND OF THE INVENTION

In the field of airport monitoring and surveillance, video cameras are used to provide live and recorded video feeds of selected areas of an airport or airport surface, such as the airport apron where airplanes are parked and passengers and cargo are loaded and unloaded. Airport aprons are busy at typical airports, with a multitude of different vehicles and persons moving about to perform the multitude of tasks together constituting the airport's operations. Airport aprons are typically extensive in physical dimensions, and a number of cameras are required in order to provide adequate coverage of the entire apron. It is often desirable to provide a single, panoramic view of an airport apron based on multiple video feeds, instead of a number of different single-camera views, as providing a panoramic view facilitates an operator's monitoring and surveillance tasks. In the particular field of airport monitoring and surveillance, it is further desirable for such a panoramic view to be provided based on video feeds in real-time such that the panoramic view provides an accurate and current view of the activities on the airport apron.

Various techniques are known for the capture and generation of panoramic still images based on multiple still images from different cameras, and include methods for the automatic stitching of still images. Such techniques are suboptimal, however, for the generation of panoramic videos based on video feeds from multiple cameras, and particularly for the generation of real-time panoramic videos. Conventional computer vision algorithms, although sometimes used for still image panorama generation, require substantial computer processing resources to stitch images, and are therefore suboptimal for stitching video image frames continuously in real time. (The term "computer vision" is here used to designate image processing algorithms which work exclusively on rectangular arrays of pixels.) Additionally, lens distortion correction using computer vision methods involves remapping every single pixel in the original undistorted image to a new position in an undistorted image and then interpolating the missing image information, which is computationally intensive.

Accordingly, alternative techniques for generating panoramic videos from multiple video feeds in real time are desirable, including when based on video feeds from multiple video cameras covering an airport apron for monitoring and surveillance purposes.

BRIEF DESCRIPTION OF THE DRAWINGS

Embodiments of the present invention will now be described, by way of example only, with reference to the attached drawings, as follows.

DETAILED DESCRIPTION

Panoramic videos may be generated from multiple video feeds in real time as described herein. The multiple video feeds may be received from multiple video cameras, such as an array of video cameras having overlapping fields of view. Texture mapping techniques may be employed to correct lens distortion or other defects or deficiencies in the video frames in each of the video feeds caused by optical properties of the corresponding video camera. Video frames of related video feeds, such as the video feeds of cameras in an array of cameras having adjacent and overlapping fields of view, may be seamlessly stitched automatically based on an initial manual configuration, again employing texture mapping techniques. A colour profile of the different video frames may be normalized to provide a uniform and seamless colour profile of the video panoramic view.

The employment of texture mapping techniques enables the use of existing hardware and software methods, reduces computational complexity as compared to computer vision methods, and enables the production of panoramic videos in real time based on multiple video feeds with lens distortion correction, field of view stitching, and colour correction. The techniques are useful in the field of airport surface monitoring and surveillance wherein multiple video feeds are received from an array of video cameras arranged such that their respective fields of view overlap and collectively cover the entirety or a substantial portion of the subject airport surface such as an airport apron.

While the techniques described herein are also useful for processing of images generally, including the correction of lens distortion and other camera optical properties, image stitching, and colour correction, whether the images are still images or video frames, the embodiments described herein address and employ video feeds comprising video frames, wherein each video frame comprises an image, including wherein video feeds are used to generate a panoramic video. Alternative applications and applications are possible based on the principles set forth herein.

Figure 1:
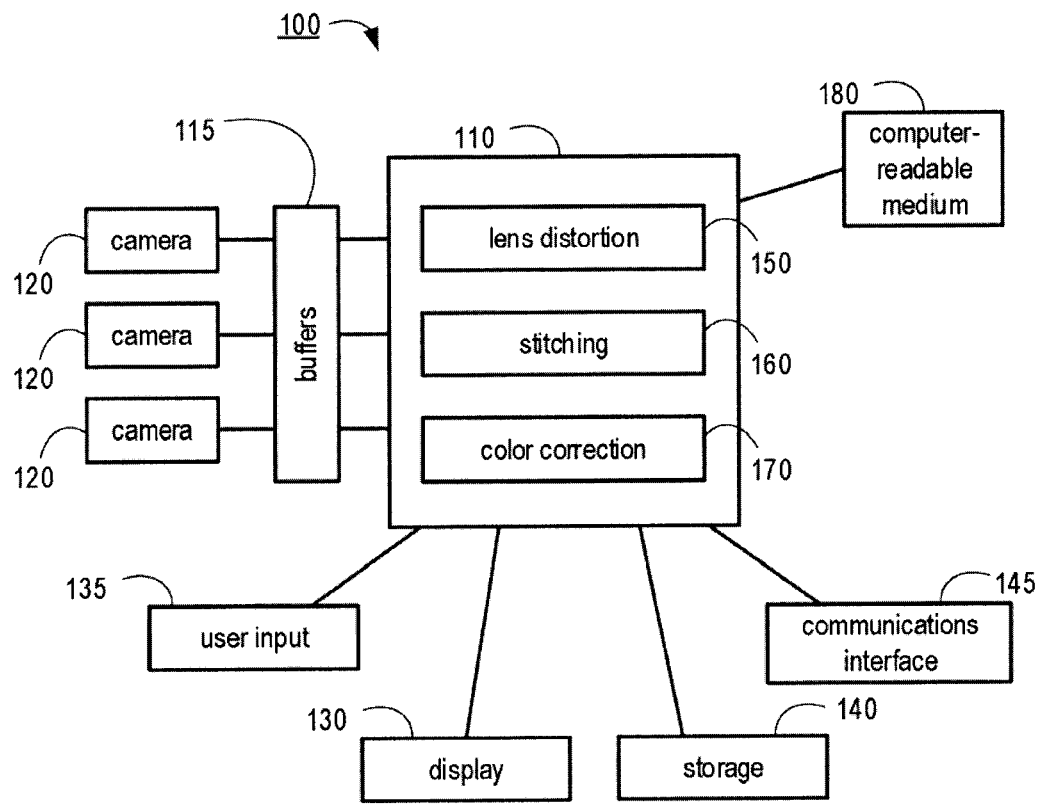
FIG. 1 is a block diagram of a system for generating a panoramic video based on video feeds received from an array of video cameras.
Figure 2:
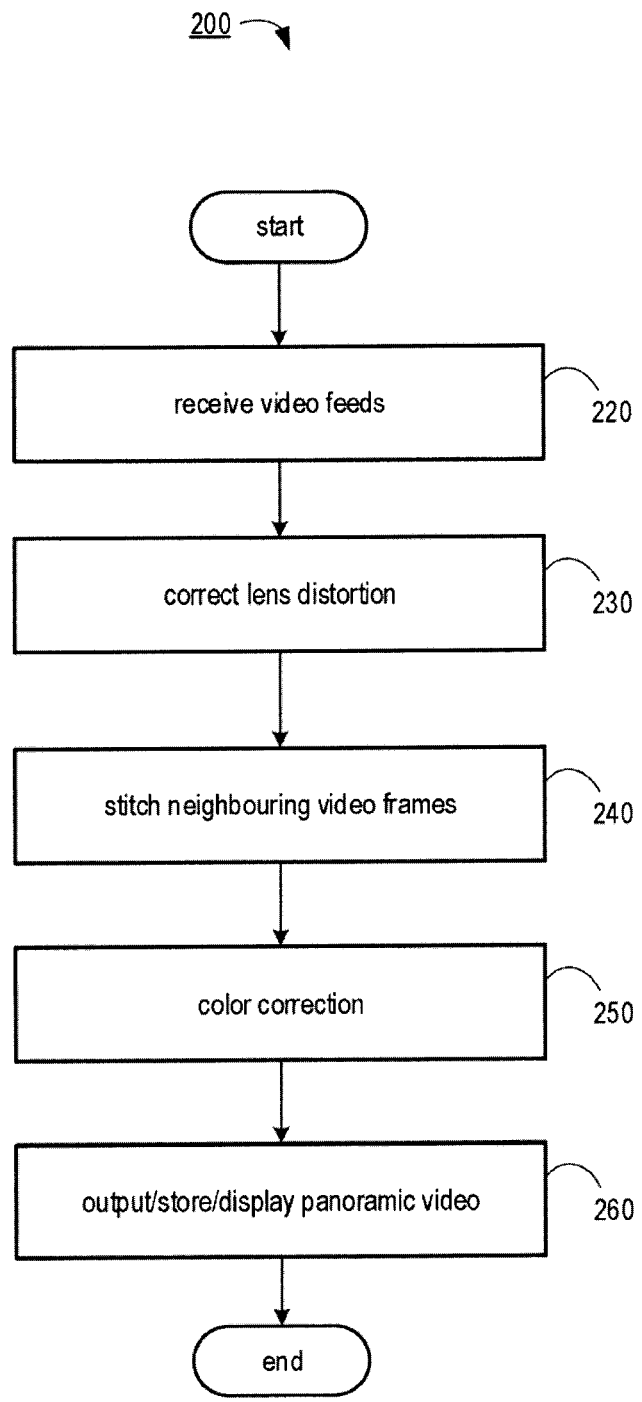
FIG. 2 is a flowchart of a method of generating a panoramic video.
Figure 3:
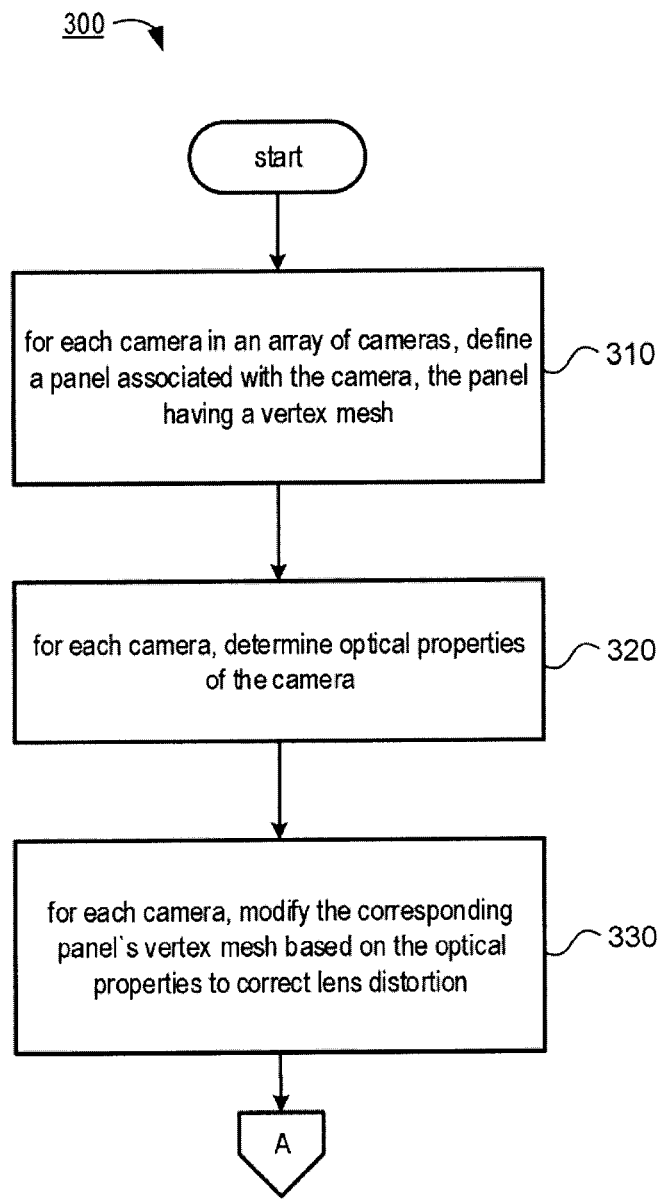
FIG. 3 is a flowchart of a part of a configuration method, to configure a system to perform lens distortion correction.

A system 100 for generating a panoramic video in real time from multiple video feeds is shown in FIG. 1. The system 100 may include an image processing unit 110 for performing an image processing method 200 shown in FIG. 2. The image processing unit 110 may be a processor that executes computer-executable instructions stored on a computer-readable medium to perform the method 200. A tangible computer-readable medium 180 may store and/or encode the instructions, for reading by the image processing unit 110 to perform the method 200.

The image processing unit 110 may interface, by one or more wired or wireless interfaces, a plurality of cameras 120 or other image recording devices, which generate the video feeds to be processed, and which are received by the image processing unit 110 via one or more interfaces of the image processing unit 110 (step 220). Each camera 120 may be a video camera which generates a corresponding video feed, the video feed comprising a sequence of video frames.

The image processing unit 110 and/or the cameras 120 and/or the video feeds are configured to enable the image processing unit 110 to associate corresponding video frames of multiple video feeds as representing or being associated with a common time or instance, or are otherwise related so as to be determined by the image processing unit 110 as being suitable for stitching in a panoramic view. A panoramic view means herein a composition of multiple images, such as video frames, showing at least partly different fields of view of a scene, such as an airport surface such as an airport apron, wherein the different images are so composed or combined to generate collectively a field of view of the scene substantially spanning the respective fields of view of the multiple images. The multiple video frames may be associated by reference to a timestamp encoded in or accompanying each video frame all of which are equal or fall within a predefined range representing a sufficient coincidence in time of the generation of the video frames by the corresponding video cameras. Alternatively, the multiple video frames may be associated by reference to respective times of arrival of the respective video frames at the image processing unit 110 within a predefined range, again representing a sufficient coincidence in time of the generation of the video frames by the corresponding video cameras. Other alternative techniques are possible.

Moreover, the image processing unit 110 may comprise one or more buffers 115 for buffering video frames of the received video streams. Buffered video frames may be fetched from the one or more buffers and processed by the image processing unit 110 as described herein. Such buffering and processing of video frames may be performed on a continuous, real-time basis, resulting in a processed video with a framerate matching a framerate of one or more of the video streams.

Each video camera may be characterized by a field of view relative to a target surface, and may also be characterized by optical properties. The target surface may be an airport surface such as an airport apron. The video cameras may together compose an array of video cameras. The video cameras in the array of video cameras may be positioned and oriented such that the respective fields of view of the video cameras collectively span or cover the target surface, and the respective fields of view of corresponding neighbouring or adjacent pairs of video cameras at least partially overlap along a border area of the fields of view. The optical properties of each camera may include a lens distortion, which may relate to a curvature of a lens of the video camera. The optical properties may also relate to other properties of optical systems, and to digital video cameras, as are known in the art.

The image processing unit 110 may be configured with separate means, modules, or components to perform each of the image processing steps described herein. For example, the image processing unit 110 may include a lens distortion module 150, a stitching module 160, and a color correction module 170, which perform lens distortion correction (step 230), image stitching (step 240), and color correction (step 250) processes, and these may be as substantially described herein. Alternatively, the image processing unit 110 may be configured with a single means or module which performs some or all of these processes. In addition, while the image processing steps as described herein as being performed in a particular order, other orders are possible, and moreover the image processing unit 110 may be configured to perform one or more of the processing steps in a single, combined step.

The image processing unit 110 may interface, by one or more wired or wireless interfaces, a display 130 to display the video feeds, video frames, panoramic video, or other processed image, and/or interface a storage 140 to store any of the foregoing; alternatively, the panoramic video or other processed image may be output to another, further means for yet further processing of the panoramic video or other processed image, or to a communication interface 145 for transmitting the panoramic video or other processed image over a network (step 260). The image processing unit 110 may further interface a user input means 135 for providing user input as described herein for performing any of the functions requiring or benefiting from user input.

The video feeds, video frames, and panoramic video, or other processed images, may be encoded in any desired digital format, and the image processing unit 110 may be configured with further means for conversion of one or more of the video feeds or video frames to another format, which may be a format selected as being suitable or advantageous for processing by the lens distortion module 150, the stitching module 160, and/or the color correction module 170, or any other component or means of the image processing unit 110. In particular, the video feeds and/or video frames which are received by the image processing unit 110 from the one or more cameras 120 may be in different formats (because, for example, the one or more cameras 120 are of different types and output their respective starting images in different digital image formats), and the image processing unit 110 may have means to convert or otherwise render the video feeds and/or video frames into a common format for further processing. In this way, the image processing unit 110 may be conveniently configured for cooperation with a diversity of cameras 120 or other image recording devices, and thus facilitate the use of new as well as legacy equipment. For example, one or more of the video streams received from the video cameras 120 may be H.264, MPEG, and/or JPEG video streams, and the image processing unit 110 may be configured with one or more video decoding libraries to receive and decode the video feeds.

Similarly, the image processing unit 110 may be further configured with means to convert or otherwise provide the panoramic video or other processed image in one or more different formats, which may be preferred or suitable for receipt and use by the display 130, the storage 140, or any other recipient of the panoramic video or processed image.

The system 100 may be configured in accordance with a configuration method 300 illustrated in FIGS. 3-15 and which may be performed only once. Thereafter, a panoramic video may be generated based on multiple video feeds from an array of cameras in accordance with a method 400 illustrated in FIG. 16, and if the relevant characteristics of the array of the cameras remains unchanged, then the configuration method 300 need not be repeated.

A configuration method 300 for configuring the system 100 to generate a real-time panoramic video based on videos feeds from a corresponding array of video cameras is now described with reference to FIGS. 3-15.

Camera Panels

The functions herein may employ texture mapping techniques which enable the use of existing software and hardware methods in the field of texture mapping to reduce computational complexity. Texture mapping is a technique wherein a three-dimensional (3D) surface is defined in computer memory with reference to a predefined 3D frame of reference, and a two-dimensional (2D) bitmap image termed a 'texture' or 'texture bitmap' is projected onto the 3D surface in accordance with a predefined texture map to generate a 3D textured surface which may be termed a "textured surface". In the 3D surface a number of vertices are defined. The texture map does not, in general, define a one-to-one relationship of each and every pixel of the 2D texture to the 3D surface, but rather defines a mapping of a subset of points in the 2D texture to the vertices of the 3D surface. Projection of the 2D texture to the 3D surface employs interpolation between the vertices based on corresponding content of the 2D texture.

The present techniques employ texture mapping by defining for each of the plurality of video feeds corresponding to the plurality of video cameras a corresponding 3D surface in computer memory with respect to a predefined 3D frame of reference. The 3D surface may be a truncated plane segment with definite extension in two dimensions. Such a 3D surface may be termed a 'panel' and may correspond to the 2D field of view corresponding to the video frames in the video feed, or in other words the field of view of the corresponding camera. Each video frame in the video feed is treated as a texture bitmap which, when projected onto the panel associated with the video feed, generates a textured surface which may be termed a "mapped video frame".

Defining a panel for each video feed individually enables modification of the panel (3D surface) based on predetermined optical properties of the corresponding video camera. For example, the panel may be modified so as to correct defects such as lens distortion, or to provide enhancements such as to introduce curvature in the final panoramic view. Defining a different panel for each of the video feeds enables relative positioning of the different panels in computer memory with reference to the 3D frame of reference so as to enable stitching of adjacent fields of view, or generation of entirely new views such as curved panoramic views or views from points of view different from the point of view of any of the video cameras.

Thus, in the configuration method 300, for each camera in the array of cameras, a panel may be defined in association with the camera, the panel having a vertex mesh (step 310), described further below.

Lens Distortion Correction

The 3D surface panel associated with each video feed may be modified, or warped, in order to correct lens distortion in the video frames of the video feed, caused by the optical properties of the corresponding camera, when the video frames are projected as texture bitmaps onto the modified panel. For example, the optical properties may include lens distortion resulting from a curvature of a lens of the camera, such that the video frames generated by the camera are characterized by the lens distortion. The panel may be modified based at least in part on a determination of the lens distortion such that when the video frames, as texture bitmaps, are projected onto the panel corresponding to the camera, the resulting mapped video frames are corrected of the lens distortion and may thus be considered to be corrected video frames.

For example, each video camera in the plurality of video cameras may have optical properties characterized by an intrinsic camera parameter matrix A:

$$A = \begin{bmatrix} \alpha_x & \gamma & u_0 \\ 0 & \alpha_y & v_0 \\ 0 & 0 & 1 \end{bmatrix}$$

In matrix A: parameters $\alpha_x = f \cdot m_x$ and $\alpha_y = f \cdot m_y$ represent the focal length f of the camera lens in terms of pixels, wherein $m_x$ and $m_y$ are scale factors relating distances between points on the image to numbers of pixels; parameters $u_0$ and $v_0$ specify the position of the principal point of the camera; and parameter y specifies the skew coefficient between the x and y axes. These five parameters define the focal length, image format, and principal point of the camera.

Each video camera's optical properties be additionally characterized by a one row matrix $Distortion_{coefficients}$ as follows:

$$Distortion_{coefficients} = (k_1 k_2 p_1 p_2 k_3)$$

which characterize lens distortion. Specifically, the $Distortion_{coefficients}$ may be used to correct radial and tangential lens distortion. For example, with respect to radial, 'barrel' or 'fisheye' lens distortion, an original pixel point (x,y) may be related to a corrected pixel point $(x_{corrected}, y_{corrected})$ as follows:

$$x_{corrected} = x(1 + k_1 r^2 + k_2 r^4 + k_3 r^6)$$

$$y_{corrected} = y(1 + k_1 r^2 + k_2 r^4 + k_3 r^6)$$

wherein r is a measure of the distance between the original point and the distortion center. Similarly, tangential distortion, resulting from, for example, the camera lenses not being perfectly parallel to the imaging plane, may be corrected according to:

$$x_{corrected} = x + [2p_1 xy + p_2(r^2 + 2x^2)]$$

$$y_{correct} = x + [p_1(r^2 + 2y^2) + 2p_2 xy]$$

For example, intrinsic camera parameter matrix A and the distortion coefficient, $Distortion_{coefficients}$, may be generated by recording a calibration video of a standard calibration target and then using CalibraCAD™ by INO (National Optics Institute Canada) on the calibration video. Other methods are possible. The parameters of the intrinsic camera parameter matrix A, as well as the distortion coefficients, $Distortion_{coefficients}$, can be calculated once in an initial configuration as the parameters in many cases do not change after initial camera alignment. When the optical properties of the camera do not change during use, then the lens distortion can also be calculated once during the initial setup.

The intrinsic camera parameter matrix A and the distortion coefficients Distortion$_{coefficients}$ may be used to modify, or warp, the panel associated with the corresponding camera in order to correct lens distortion, or in other words to model a camera like the corresponding camera but lacking lens distortion. Modification of the panel need only be done once, and once this initial configuration is completed, video frames received from each camera appear corrected, or undistorted, by the image processing unit by projection onto the modified panel.

Figure 4:
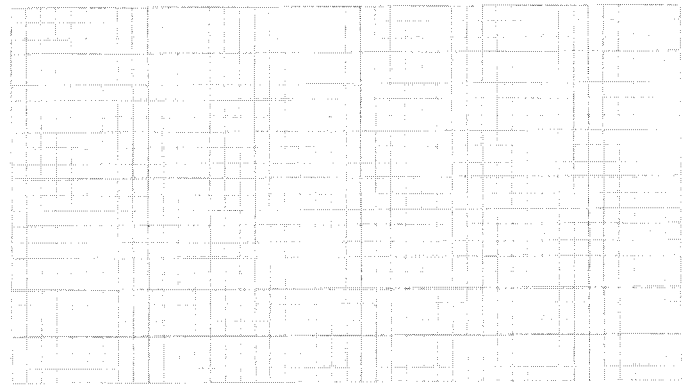
FIG. 4 shows an exemplary panel vertex mesh.

Prior to modification based on the optical properties of the camera, panel vertices may be implemented as a quad mesh 400 as shown in FIG. 4, wherein each quadrilateral possessing four of the vertices may be termed a quadrant or 'quad'. The initial size of the quads, or in other words the coarseness of the mesh, may be selected based on the requirements of a particular application. In general, a coarser mesh (larger quads) enables more accurate lens distortion correction than a finer mesh (smaller quads). The number of quads can be defined and changed freely. In a special case, as many quads as pixels are defined, and as such this case corresponds to a naïve computer vision approach. Using fewer, larger quads reduces computational complexity and thus enables the generation of real-time corrected video using conventional computing equipment.

Figure 5A:
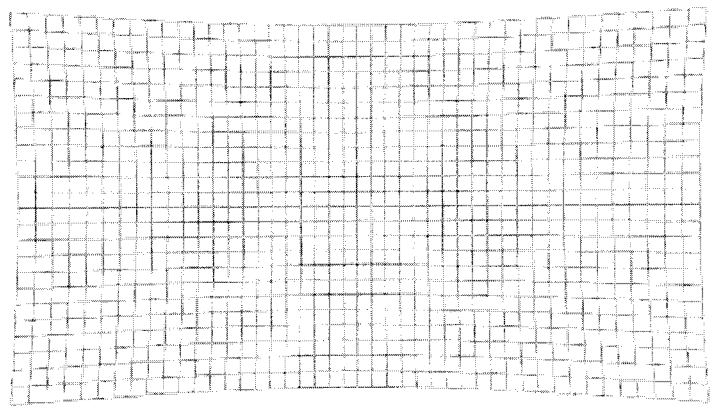
FIG. 5A and FIG. 5B show the exemplary panel vertex mesh warped based on determined camera optical properties including lens distortion.
Figure 5B:
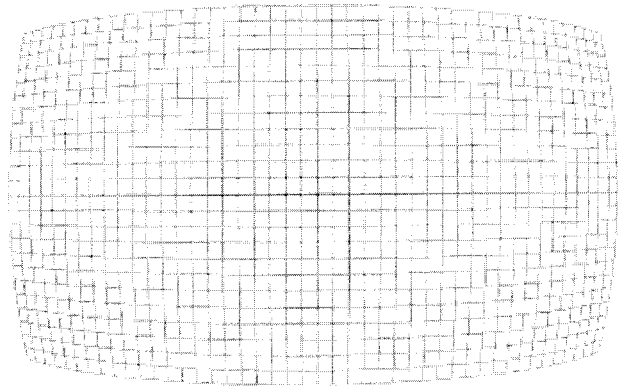

In order to provide lens distortion correction, the panel quad mesh is then modified, or warped, based on the intrinsic camera parameter matrix A and the distortion coefficients. Specifically, each vertex of the quad mesh is translated in the plane of the panel to a location corresponding to where the corresponding texture bitmap pixel would appear in an image but for lens distortion. Thus, as shown in FIGS. 5A & 5B, the quad mesh may be warped—that is, the vertices are translated—so as to correct for 'barrel', or 'fisheye' lens distortion to produce corresponding warped panel 505, or correct an opposite, 'pincushion' distortion to produce corresponding warped panel 510. The translation required for each vertex may be determined according to any suitable method.

For example, a function of the openCV library, for example cvinitUndistMap(in: A, in: DistortionCoefficients, Out: mapX, out: mapY), may be used. Alternative methods are possible.

Thus, in accordance with the foregoing, the method 300 includes, for each camera, determining optical properties of the camera (step 320) and, for each camera, modifying the corresponding panel's vertex mesh based on the optical properties to correct lens distortion (step 330).

Figures 6, 7:
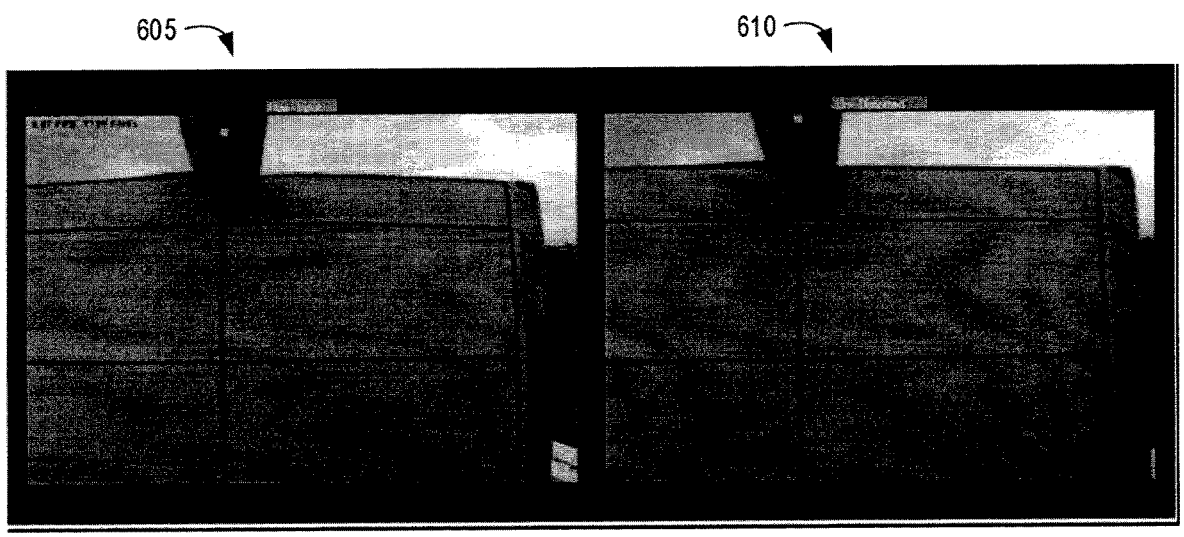
FIG. 6 shows an image characterized by lens distortion.
FIG. 7 shows the image of FIG. 6 projected onto a warped panel for correction of lens distortion.

Having generated a modified, warped quad mesh of the panel, correction of lens distortion in a corresponding video frame is performed automatically when the video frame is projected as a texture bitmap onto the panel wherein the texture bitmap is piecewise mapped to the quad mesh at discrete points in the map, namely the vertices of the quads. For example, FIG. 6 shows a starting image 605 characterized by 'fisheye' lens distortion, and a corrected image 610 wherein lens distortion is corrected using a warped panel similar to warped panel 505 according to the present method.

In conventional computer vision methods for correcting lens distortion, it is typically required to calculate a new position in the undistorted image for each pixel in the original, distorted image. Every pixel may be mapped and the gaps interpolated for each new video frame in each video stream. Such methods may use existing libraries such as IPP or OpenCV, for example, and others are possible. Interpolation methods such as nearest neighbor, bi-linear, and cubic used with such libraries are typically computationally intensive, however.

The texture mapping method of lens distortion correction described herein may alternatively use a standard graphics library such as OpenGL, wherein mipmapping may be used to interpolate between panel vertices. In such application, interpolation and texture to surface mapping may be performed using existing dedicated hardware circuitry (such as a video card) with the result that no or little central processing unit (CPU) or graphics processing unit (GPU) processing time is required. In this way, real-time lens distortion correction of video frames is enabled. Moreover, by using a superior interpolation method such as mipmapping, a greater accuracy of video frame correction may be achieved, which facilitates video frame stitching as described below.

Image Stitching

In order to generate a panoramic view based on video feeds from an array of cameras arranged with overlapping fields of view, the corresponding panels or other 3D surfaces may be defined in computer memory as having positions and orientations with respect to the 3D frame of reference so as to overlap at adjacent edges thereof based on corresponding video frames received from the array of cameras and captured at or about the same time.

For example, certain corresponding video frames from the respective cameras may be collected or received at or about a given time, or are otherwise related in such a way as to represent a common instant with respect to the panoramic view ultimately to be generated.

It will be understood that the terms "adjacent cameras" or "neighbouring cameras" in an array of cameras mean cameras having overlapping fields of view, the terms "adjacent images", "adjacent frames", "neighbouring images", or "neighbouring frames" means images or frames generated by adjacent or neighbouring cameras, whether they are video frames in a video feed or otherwise.

In particular, a corresponding calibration image may be selected for each camera, thus providing a set of calibration images for the cameras. The calibration images may be corresponding images generated by the cameras of a scene at a given time. The images may be corresponding video frames from video feeds generated by the array of cameras, the video frames corresponding in time. While the scene may include a known target such as a calibration target, it need not do so, and may include simply a present scene such as a current state of an airport apron.

These calibration images may be projected onto the panels corresponding to the cameras as discussed above so as to generate corrected calibration images wherein lens distortion and/or other defects or deficiencies in the optical properties of the cameras are corrected (step 810).

Using preconfigured computer input and display means, such as the user input 135 and display 130, a user may manually and visually position, orient, and scale the corrected calibration images to overlap in respective boundary areas, and thereby modify the respective positions, orientations, and sizes of the underlying panels with respect to the 3D frame of reference in computer memory to overlap in respective boundary areas (step 820). For example, using the input and display means the user may translate, rotate, or scale any individual textured panel, which thereby defines 3D coordinates of the panel in the predefined 3D frame of reference. In particular, the user may use the input and display means to position adjacent corrected video frames— that is, corrected video frames corresponding to cameras having overlapping fields of view—so as achieve visual overlap of the adjacent corrected video frames along bordering portions thereof, and in this way define the relative position of the underlying panels corresponding to the corrected video frames in the 3D frame of reference in computer memory. The user may in this way position each of the corrected video frames relative to all of the other corrected video frames corresponding to the array of cameras, and thus define the relative positions with respect to the 3D frame of reference of all of the frames corresponding to all of the cameras in the camera array, while providing for correct overlap of the respective fields of view along border portions thereof. As above, the panel coordinates may be defined by use of known OpenGL libraries.

Figure 9:
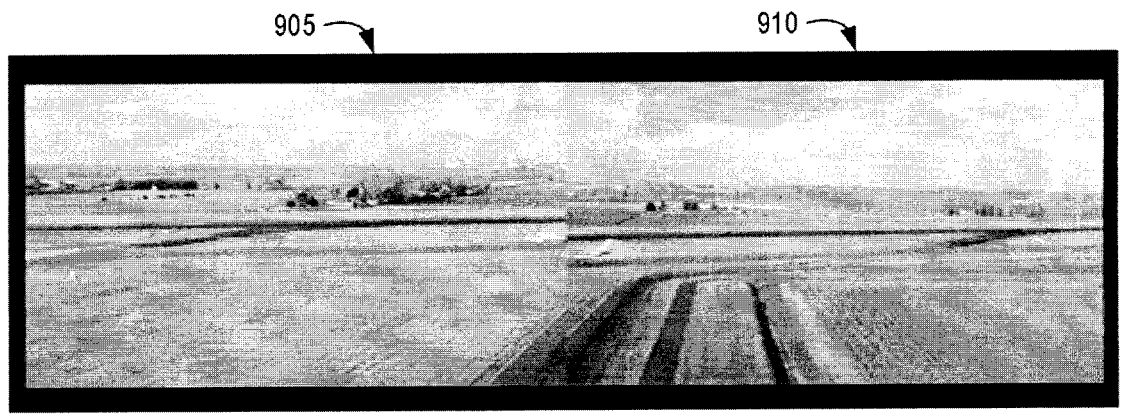
FIG. 9 shows neighbouring images from an array of cameras projected onto corresponding panels.
Figure 10:
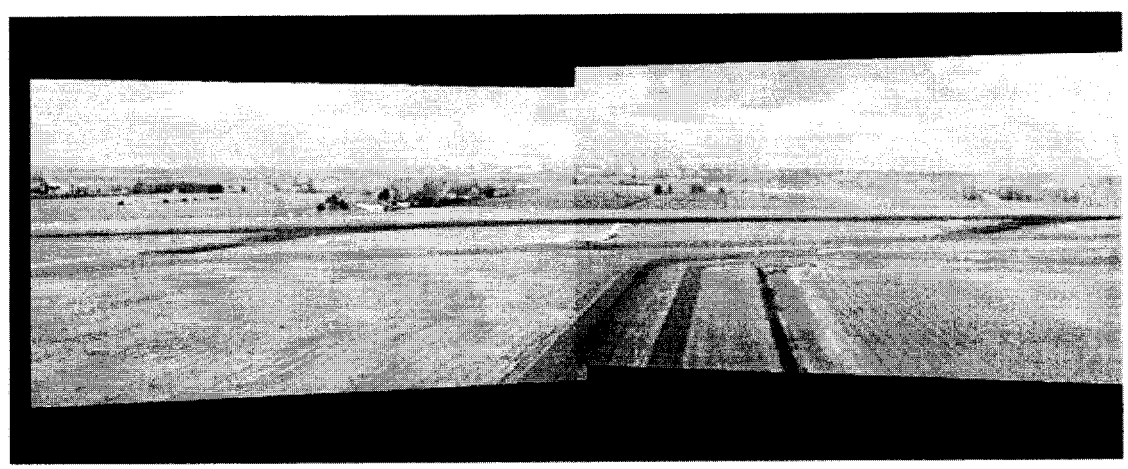
FIG. 10 shows the panels of FIG. 9 modified to overlap the panels in a boundary area.

By way of illustration, FIG. 9 shows a scene composed of two images (video frames) 905, 910 received from two corresponding cameras having adjacent fields of view. FIG. 10 shows the relative position and orientation of the two textured panels 1005, 1010 after being moved, rotated, and scaled manually using a user interface and display.

Figure 12:
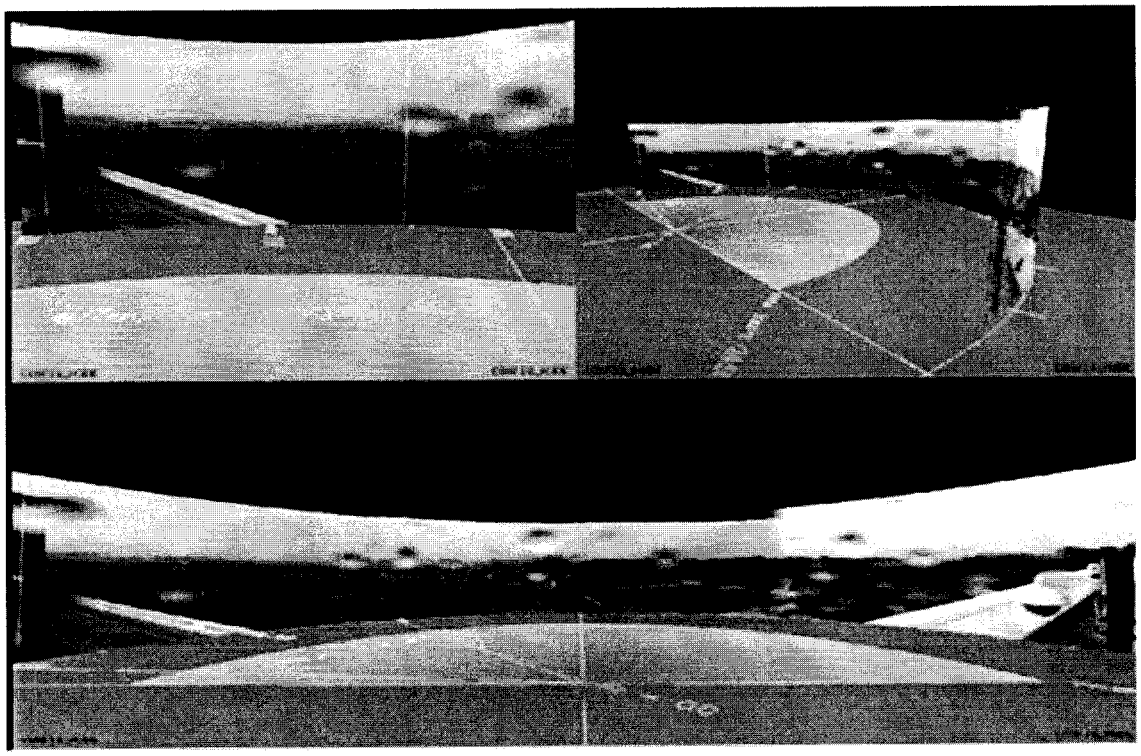
FIG. 12 shows illustrates an example of curved panels arranged to provide a curved panoramic view.
Figure 13:
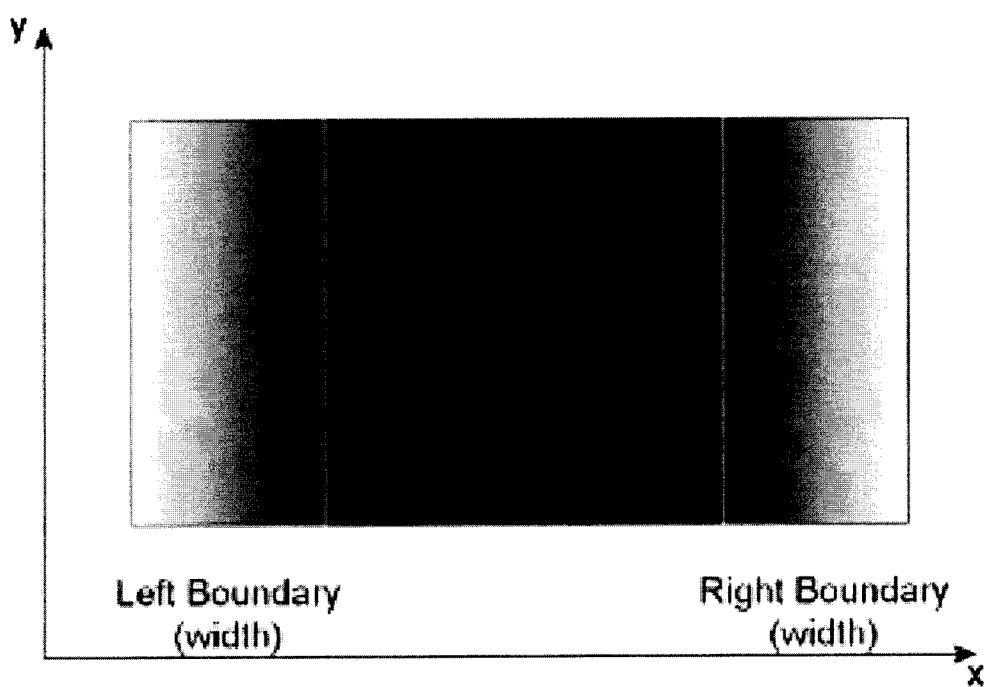
FIG. 13 shows a chart illustrating alpha compositing to provide blending in panel boundary areas.

The ability not only to translate neighbouring textured panels relative to one another, but also to scale and rotate the images along any axis in the 3D frame of reference, enables the user to configure the relative positions and orientations of the panels in the 3D frame of reference so as to reflect accurately the relative positions and orientations of the corresponding cameras in the array of cameras. In particular, such enables the user to achieve optimal alignment amongst the respective square frustums which represent the fields of view of the cameras. The panels may be positioned and oriented in accordance with the desired final panoramic view. For example, if the cameras are mounted in a half circle, the panels may be bent to create a superior view, as illustrated in FIG. 12.

Image Blending

Computer graphics methods may also be used to provide blending of adjacent images in the overlapping border area, a task commonly done using computer vision methods.

In general, the above image stitching method may result in one or more pairs of neighbouring panels, corresponding respectively to neighbouring cameras have overlapping fields of view, which overlap in a boundary area. With reference to FIG. 10, for example, a first panel may overlap with a second panel at a left side of the first panel, thus defining a boundary of the boundary area representing an edge of the second panel. (Similarly, the first panel may also overlap in another boundary with a third panel on another side of the first panel, thus defining another boundary). A corresponding boundary may be defined in the second panel, representing the edge of the first panel, likewise to define the boundary area.

Blending of the two panels in the boundary area may then be performed by alpha compositing in the boundary area. In other words, for one or both of the panels, an alpha value of the panel pixels in the boundary area may be assigned so as to decrease from the boundary to the panel edge, thereby increasing the texture panel's transparency progressively from the boundary edge to the panel edge. For example, with reference to FIG. 13, an alpha value for the first panel may set as:

$$\text{left boundary area: } \alpha = 1.0 \cdot \frac{x}{LeftBoundary}$$

$$\text{right boundary area: } \alpha = 1.0 \cdot \frac{PanelWidth - x}{RightBoundary}$$

middle area: $\alpha=1.0, \forall x | (x \geq LeftBoundary) \land (x \leq PanelWidth - RightBoundary)$ wherein in FIG. 13 an alpha value of $\alpha=1.0$ is shown as black, and an alpha value of $\alpha=0.0$ is shown as white.

When neighbouring panels are in a common plane, they may be offset slightly in a direction orthogonal to that plane (e.g. along a z-axis) to provide for overlap as to assist blending in the boundary area. In this way, blending is performed in the overlapping boundary area of the first and second panels, with the first panel positioned above, or in front of, the second panel, or vice versa, where the alpha values of the first panel in the boundary area are lower than 1.0 thus rendering the textured panel transparent allowing the second textured panel to be visible partly in the boundary area. The lower the alpha value, the more the second texture panel becomes visible from behind the first textured panel.

Figure 8:
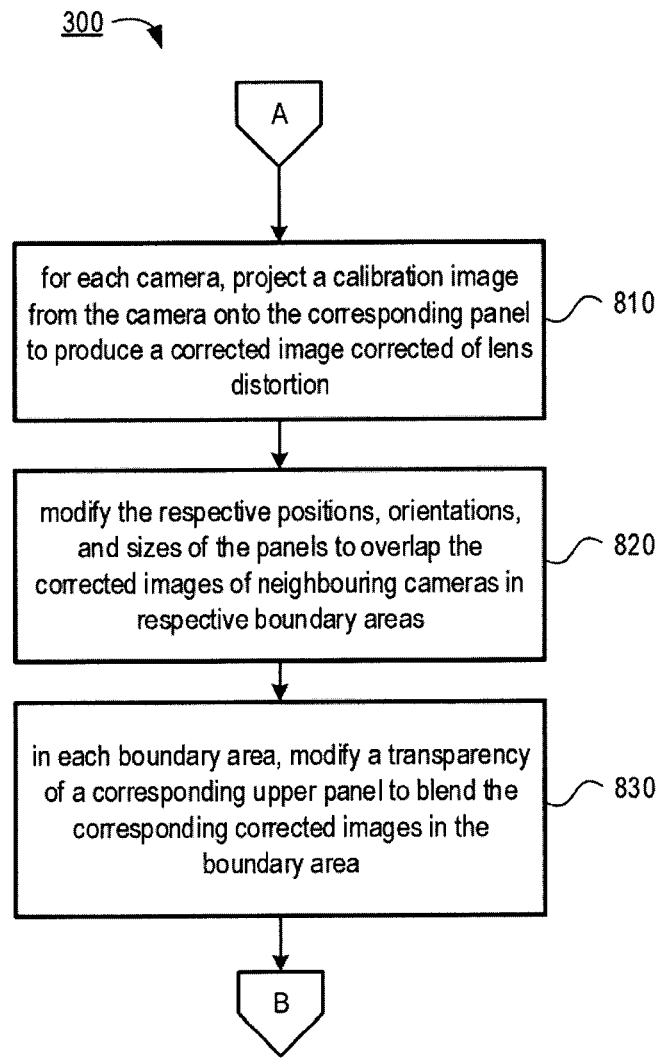
FIG. 8 is a flowchart of a part of a configuration method, to configure a system to perform image stitching.
Figure 11:
FIG. 11 shows the panels of FIG. 10 blended in the boundary area.

Thus, in accordance with the above, and with reference to FIG. 8, the method 300 may be continued by modifying, in each boundary area of neighbouring panels, a transparency in a corresponding upper panel to blend the corresponding corrected calibration images in the boundary area (step 830). An example of blending of the panels 1005, 1010 shown in FIG. 10 according to the above method to produce stitched and blended panels 1105, 1110 is shown in FIG. 11.

As in the case of image stitching, described above, the alpha channels of the panels in any overlapping boundary areas may be defined only once during an initial configuration step. Thereafter, both image stitching and blending are performed automatically by projection of received video frames onto the corresponding panels. Blending in this way assures a seamless transition between panels. Efficiency and reduced processor load may be achieved by using existing computer graphics software and hardware such as a computer graphics card to perform the projection of the video frames onto the corresponding stitched and blended panels. Achieving equivalent blending by computer vision methods would, in contrast, be computationally intensive and may not enable processing rates sufficient for generation of real-time panoramic video.

When the relative positions and orientations of the cameras in the array of cameras remains unchanged, the initial configuration need only be performed once. Stitching of corresponding video frames of video feeds of the cameras in the array of cameras then proceeds according to texture mapping methods, wherein each new video frame is treated as a texture bitmap and is projected onto the corresponding panel which is now positioned and oriented in the 3D frame of reference in overlapping relation with the other panels so as to facilitate stitching of each new set of video frames.

Colour Correction

Video sources such as cameras may have different properties and environmental conditions which affect the colour properties of resulting video images, such different illumination, iris- and shutter settings, and the like. Therefore, combining images from different sources may take into account the different colour properties of the video sources.

Figure 14:
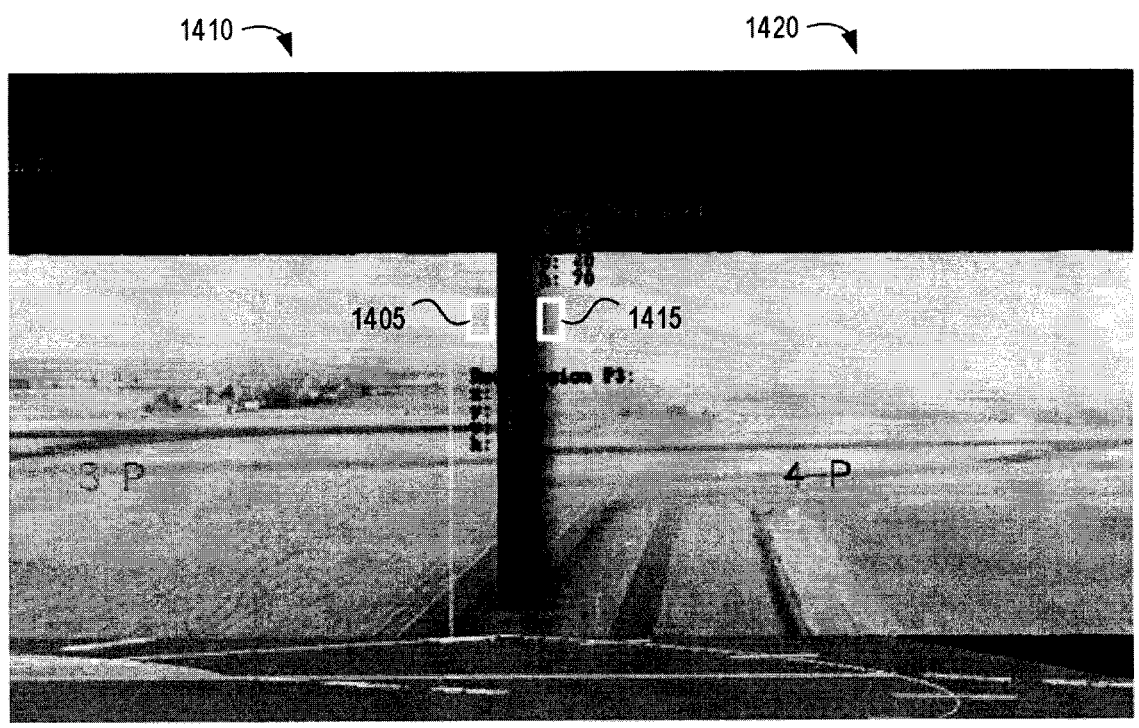
FIG. 14 shows the neighbouring panels of FIGS. 9-11, and an exemplary selection of a reference region and check region to normalize colours of the panels.
Figure 15:
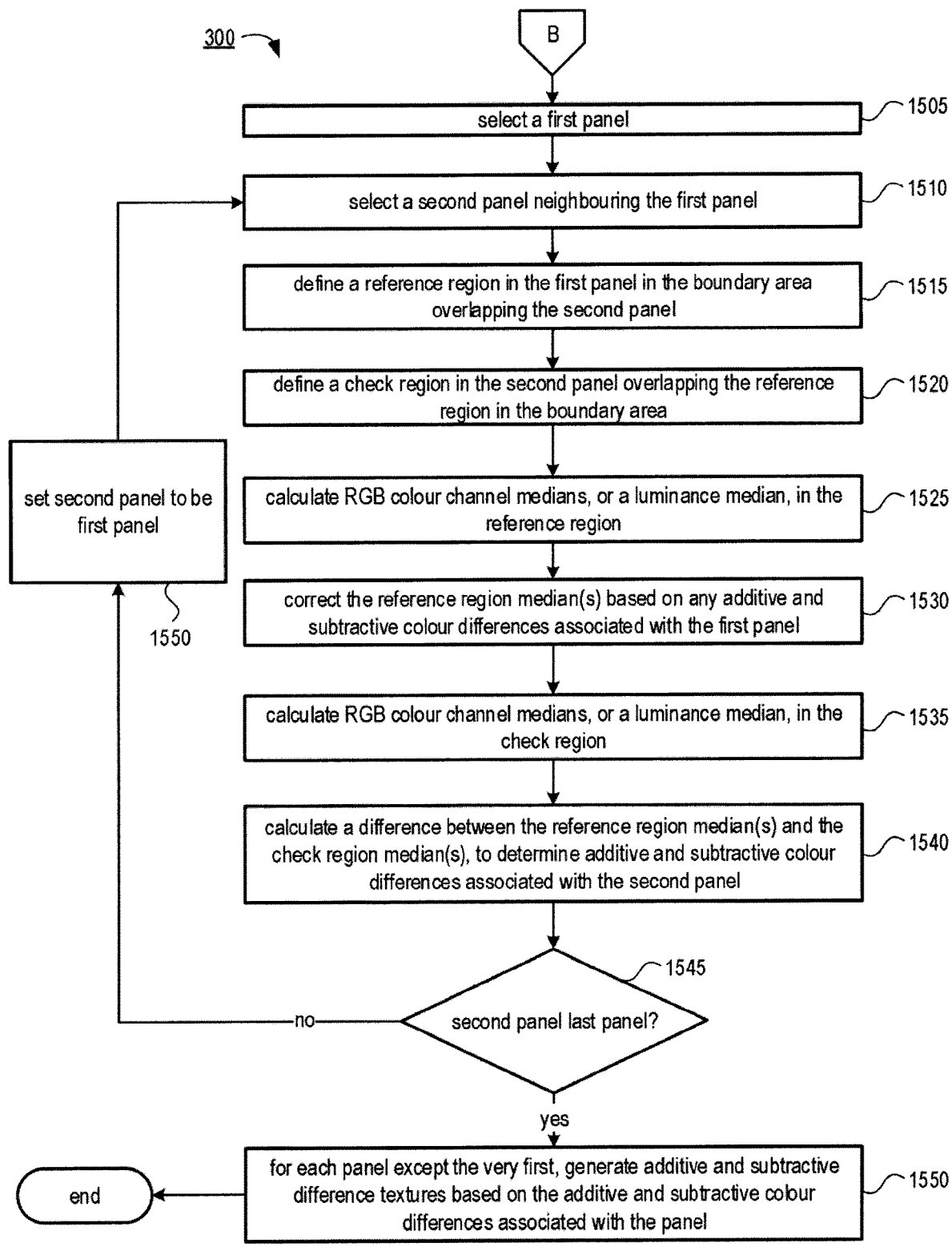
FIG. 15 is a flowchart of a part of a configuration method, to configure a system to perform colour normalization of neighbouring panels.

Thus, the calibration method 300 may continue as shown in FIG. 15 to perform a colour correction configuration of the image processing unit 110. The method may be performed pairwise and stepwise on each pair of neighbouring cameras in the array of cameras. Thus, as a first step in the method, a first panel corresponding to a first camera is selected (step 1510), and a second panel neighbouring the first panel is selected (step 1520). The first camera may be, for example, a left-most or right-most camera in the array of cameras, and the method proceeds stepwise and pairwise from that left-most or right-most camera through all of the cameras in the array. With reference to FIG. 14, the first panel 1410 and second panel 1420 may be the stitched and blended panels shown in FIG. 11. In general, the first panel 1410 and second panel 1420 are generated by projection of corresponding first and second images from neighbouring cameras in an array of cameras upon their corresponding panels which, further to the above, may be warped to correct lens distortion, and stitched and blended.

A first, reference region 1405 may be defined in a first panel 1410 in the boundary area overlapping the second panel (step 1515), and a second, check region 1415 may be defined in the second panel 1420 overlapping the reference region in the boundary area (step 1520). The reference and check regions may be manually adjustable in position and size. The reference and check regions may define corresponding regions in the boundary area of the first and second panels, meaning they may bound the same aspect of the scene commonly shown in the first and second corrected calibration images in the boundary area.

For the reference region, a median may be calculated for each RGB colour channel separately (colour correction) or alternatively all channels together (luminance correction), to determine reference region median(s) (step 1525). The reference region median(s) may be corrected based on any additive and subtractive colour differences associate with this panel (step 1530). This correction is further described below, and is applicable to all of the panels except the very first, left-most or right-most, panel in the array. Similarly, for the check region, a median may be calculated for each RGB colour channel separately (colour correction) or alternatively all channels together (luminance correction), to determine check region median(s) (step 1535). A difference of the reference region median(s) and the check region median(s) is then calculated to determine additive and subtractive colour differences associated with the second panel (step 1540).

If the second panel is not the last panel in the array (decision 1545), then the second panel is set to be the first panel—in other words, the method 'shifts' to the next pair of neighbouring panels in the array—and the method repeats. Now, the relevant boundary area in which reference and check regions are defined is a boundary area between the second panel (now termed the first panel) with a further, third panel (now termed the second panel). It will now be understood that in step 1530 the reference region median(s) now calculated in the new boundary area of the second panel (now termed first panel) is corrected by the additive and subtractive colour differences calculated with respect to the first panel in the preceding round. In this way, all median(s) calculated for all of the panels are normalized ultimately to the median(s) calculated first a single, starting panel.

If the second panel is the last panel in the array (decision 1545), then additive and subtractive colour differences will have been calculated for all of the panels in the array, except the very first left-most or right-most panel, and all of these colour differences will serve to normalize the median(s) of the panels to the median(s) of that first left-most or right-most panel. For each of the panels, the corresponding additive and subtractive colour differences are then used to generate corresponding additive and subtractive difference textures wherein the determined additive colour differences are encoded in the pixels of the additive difference texture and the subtractive colour differences are encoded in the pixels of the subtractive difference texture, and the additive and subtractive difference textures are associated with the corresponding panel (step 1550).

Optionally, each panel may also be divided into two or more sub-regions for the purpose of colour correction, and the colour correction method described above may be performed with respect to the corresponding sub-regions in each neighbouring pair of panels. For example each panel may be divided into an upper part and a lower part. The upper and lower parts may be divided by an apparent horizon, such that the upper part contains mostly or entirely an image of sky, and the lower part contains mostly or entirely an image of ground and ground objects. A different reference region may be defined for each of the upper and lower sub-regions in one of the corrected calibration images, and similarly a different check region may be defined for each of the upper and lower sub-regions a neighbouring corrected calibration image. A median for each of the RGB colour channels may be determined separately in the upper and lower sub-regions of the first image, and subtracted from medians determined for each of the RGB colour channels separately in the upper and lower sub-regions of the second image, to determine additive and subtractive colour differences for each of the upper and lower sub-regions. An additive difference texture may then be generated having additive differences from the upper and lower sub-regions, and likewise a subtractive difference texture may be generated having subtractive differences from the upper and lower sub-regions.

Colour correction of video frames received in a given video feed from a camera in the array is then performed by projecting the video frames onto the panel corresponding to the video feed, and additional projecting onto the panel the associated additive and subtractive difference textures. Thus, the three textures are commonly projected onto the same panel, which may be modified, or warped, to correct lens distortion as described above, thus producing a corrected image wherein both lens distortion and colour differences are corrected. As with lens distortion correction as described above, colour correction is performed using texture mapping methods, and thus known computer graphics software and hardware means, such as video cards, may be used to perform the method.

Panoramic Video Generation

Once the configuration method 300 is performed, generation of a panoramic video based on video feeds from an array of cameras, with lens distortion correction, stitching, and colour correction proceeds simply by projection of the video frames of the video feeds as textures onto the warped, alpha composited panels of the corresponding panels, and further projection of the corresponding positive and negative difference textures onto the same panels.

Figure 16:
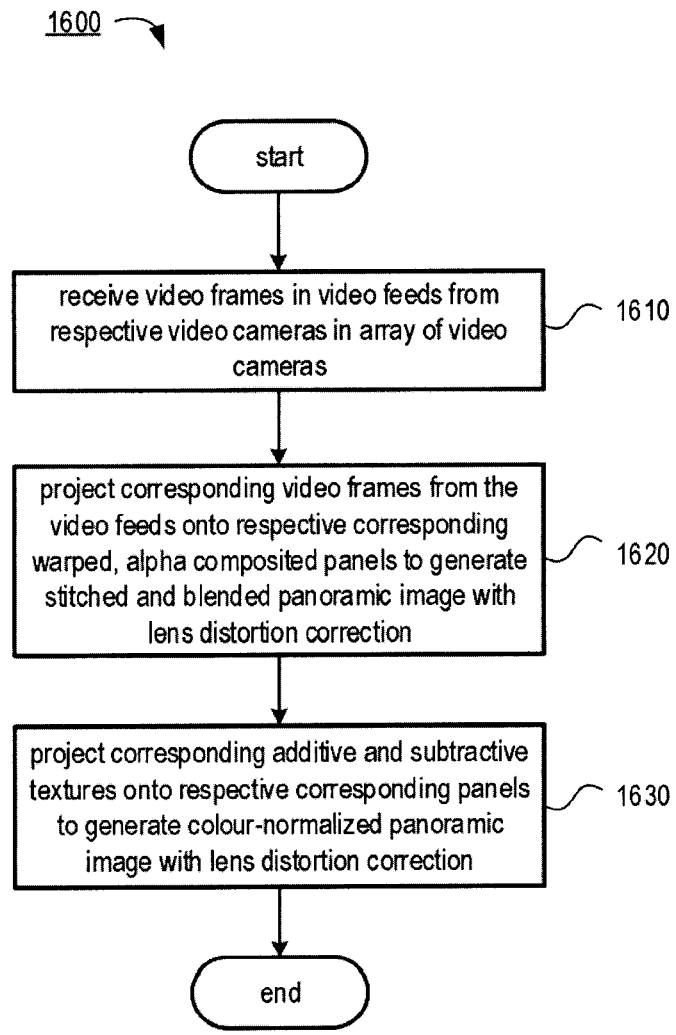
FIG. 16 is a flowchart of a method of generating a panoramic video with lens distortion correction, stitching, blending, and colour normalization based on video feeds from an array of cameras.

Thus, according to the method 1600 shown in FIG. 16, video frames are received in video feeds from respective video cameras in an array of cameras (step 1610). The video frames are projected onto respective corresponding warped, alpha composited panels to generate a stitched and blended panoramic image with lens distortion correction (step 1620). In order to provide colour profile normalization, the additive and subtractive textures are projected onto the respective corresponding panels to generate a colour-normalized, stitched and blended panoramic image with lens distortion correction (step 1630).

Figure 17:
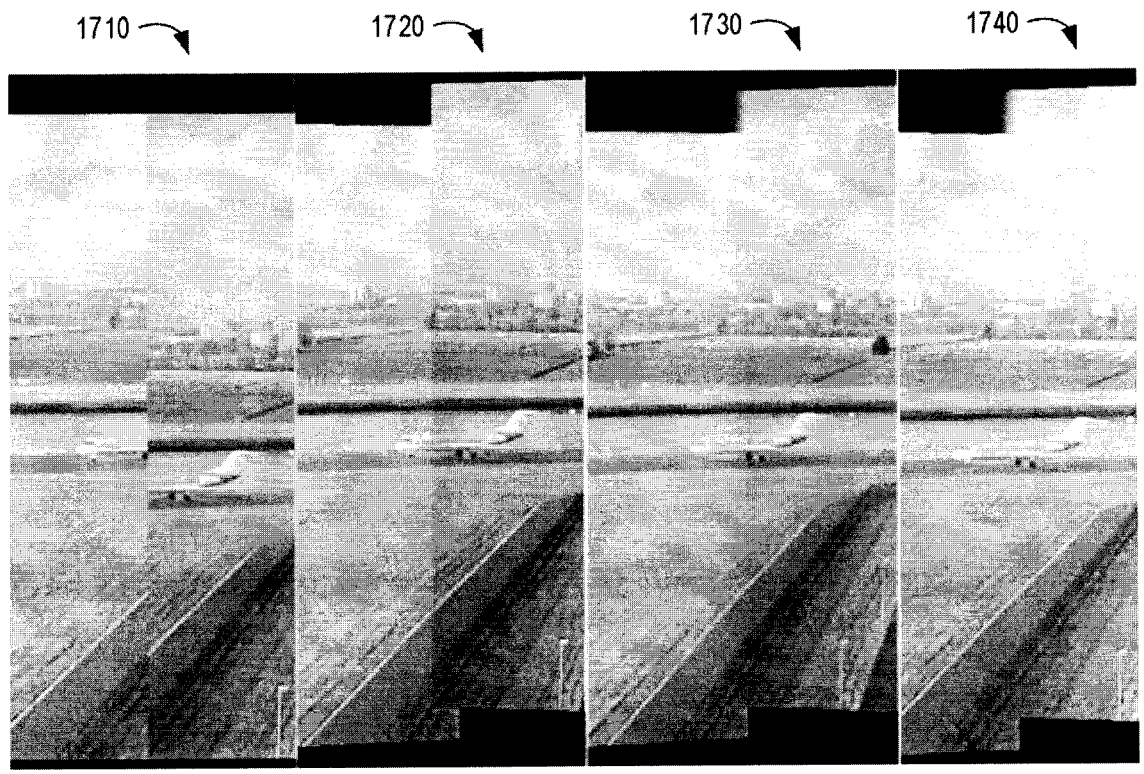
FIG. 17 is a series of images illustrating panoramic image generation with lens distortion correction, stitching, blending, and colour normalization.

FIG. 17 illustrates the steps in the process. Images from neighbouring cameras in an array were projected onto corresponding panels warped to correct lens distortion to produce texture panels with lens distortion correction 1710. The textured panels were then visually aligned by manipulation of the underlying panels to produce a stitched textured panels with lens distortion correction 1720. These were then alpha-composited to produce blended, stitched textured panels with lens distortion correction 1730. Finally, corresponding positive and negative difference textures were generated and projected onto the respective panels to produce stitched, blended, and colour-normalized textured panels with lens distortion correction—a panoramic image 1740.

Advantages

As the panoramic images are produced by projection of video frames and difference texture bitmaps onto preconfigured and static 3D surface panels, in accordance with texture mapping techniques, existing texture mapping software and hardware may be used to generate the panoramic images. Moreover, the use of such techniques and means enables the generation of a real-time panoramic video with colour normalization and lens distortion correction from video feeds from an array of video cameras, a result not feasible employing computer vision methods and typical computer means. The use of texture mapping techniques yet further advantages, such as the manipulation of a point-of-view with respect to the panels, thus enabling the generation of views not feasible using computer vision techniques.

The above techniques enable generation of stitched panoramic videos, especially when used with colour-normalization, lens distortion correction and alpha blending, which is faster by orders of magnitude compared to naïve computer vision methods. The naïve approach is usually computationally expensive compared to the computer graphics methods used herein.

The following represent non-limiting examples of embodiments according to the principles described herein.

EXAMPLE 1

A method of generating a panoramic video from a plurality of video feeds, the method comprising: using a processor to define in computer memory, for each video feed, a three-dimensional (3D) surface modelling optical properties of the video camera absent lens distortion; for each video feed, using the processor to project corresponding calibration images onto the corresponding 3D surface to generate corrected calibration images corrected of lens distortion; using the processor to stitch the 3D surfaces based on the corrected calibration images; and using the processor to project video frames received in the video feeds onto the respective 3D surfaces to generate the panoramic video.

EXAMPLE 2

The method according to Example 1, wherein each 3D surface comprises a corresponding panel having a vertex mesh, and the processor modifies the vertex mesh based on intrinsic camera parameters distortion coefficients to generate a warped panel, wherein the processor projects the corresponding calibration images onto the corresponding warped panels to generate the corrected calibration images, and projects the video frames onto the corresponding warped panels to generate the panoramic video.

EXAMPLE 3

The method according to Example 1, wherein using the processor to stitch the corrected video frames comprises: for each 3D surface, using a display and a user interface to modify in the computer memory a position, orientation, and/or size of the 3D surface with reference to a predefined 3D frame of reference to overlap one or more neighbouring corrected calibration images in respective boundary areas.

EXAMPLE 4

The method according to Example 3 further comprising using the processor to blend the corrected calibration images in the boundary areas by modifying, in each boundary area, a transparency of a corresponding upper panel in the boundary area to blend the corresponding corrected calibration images in the boundary area.

EXAMPLE 5

The method according to Example 4, wherein the processor modifies the transparency of the corresponding upper panel in the boundary area by modifying an alpha channel of the corresponding upper panel in the boundary area.

EXAMPLE 6

The method according to Example 1, wherein the processor further normalizes a colour profile of the video frames to generate the panoramic video.

EXAMPLE 7

The method according to Example 6, wherein the processor normalizes the colour profile of the video frames by, for each neighbouring pair of the corrected calibration images comprising a first image and a second image overlapping in a boundary area: a) defining a reference region in the first image in the boundary area; b) defining a check region in the second image overlapping the reference region in the boundary area; c) calculating one or more reference region medians in the reference region; d) calculating one or more check region medians in the check region; e) calculating median differences associated with the second image based on the reference region medians and the check region medians; and f) based on the median differences, generating a difference texture associated with the 3D surface corresponding to the second image.

EXAMPLE 8

The method according to Example 7, wherein the processor normalizes the colour profile of the video frames by further, for each 3D surface, projecting the corresponding difference texture onto the 3D surface in addition to the video frames of the corresponding video feed.

EXAMPLE 9

The method according to Example 7, wherein for at least one corrected calibration image calculating the reference region medians comprises subtracting median differences associated with the corrected calibration image.

EXAMPLE 10

The method according to Example 7, wherein the reference region medians comprise respective medians of RGB colour channel values in the reference region, the check region medians comprise respective medians of RGB colour channel values in the check region, and e) comprises subtracting the medians of RGB colour channel values in the reference region from the respective medians of RGB colour channel values in check region.

EXAMPLE 11

The method according to Example 10, wherein the reference region medians comprise a median luminance value in the reference region, the check region medians comprise a median luminance value in the check region, and e) comprises subtracting the median luminance value in the reference region from the median luminance value in the check region.

EXAMPLE 12

The method according to Example 7, wherein a) to f) are performed iteratively on successive neighbouring pairs of the video frames beginning in a first iteration wherein the first image corresponds to a left-most or right-most video camera in an array of the video cameras.

EXAMPLE 13

A system for generating a panoramic video from a plurality of video feeds, the system comprising a processor and a memory storing instructions executable by the processor: to define in computer memory, for each video feed, a three-dimensional (3D) surface modelling optical properties of the video camera absent lens distortion; for each video feed, to project corresponding calibration images onto the corresponding 3D surface to generate corrected calibration images corrected of lens distortion; to stitch the 3D surfaces based on the corrected calibration images; and to project video frames received in the video feeds onto the respective 3D surfaces to generate the panoramic video.

EXAMPLE 14

The system according to Example 13, wherein the system further comprises a display and a user interface connected to the processor and memory to stitch the 3D surfaces, wherein the display and the user interface are used to modify in the computer memory a position, orientation, and/or size of each 3D surface with reference to a predefined 3D frame of reference to overlap one or more neighbouring corrected calibration images in respective boundary areas.

EXAMPLE 15

The system according to Example 14, wherein the instructions are further executable by the processor: to blend the corrected calibration images in the boundary areas by modifying, in each boundary area, a transparency of a corresponding upper panel in the boundary area to blend the corresponding corrected calibration images in the boundary area.

EXAMPLE 16

The system according to Example 15, wherein the processor modifies the transparency of the corresponding upper panel in the boundary area by modifying an alpha channel of the corresponding upper panel in the boundary area.

EXAMPLE 17

The system according to Example 13, wherein the instructions are further executable by the processor to normalize colour profiles of the video frames, to generate the panoramic video, by, for each neighbouring pair of the corrected calibration images comprising a first image and a second image overlapping in a boundary area: a) defining a reference region in the first image in the boundary area; b) defining a check region in the second image overlapping the reference region in the boundary area; c) calculating one or more reference region medians in the reference region; d) calculating one or more check region medians in the check region; e) calculating median differences associated with the second image based on the reference region medians and the check region medians; and f) based on the median differences, generating a difference texture associated with the 3D surface corresponding to the second image.

EXAMPLE 18

The system according to Example 17, wherein the processor normalizes the colour profile of the video frames by further, for each 3D surface, projecting the corresponding difference texture onto the 3D surface in addition to the video frames of the corresponding video feed.

EXAMPLE 19

The system according to Example 17, wherein the reference region medians comprise respective medians of RGB colour channel values in the reference region, the check region medians comprise respective medians of RGB colour channel values in the check region, and e) comprises subtracting the medians of RGB colour channel values in the reference region from the respective medians of RGB colour channel values in check region.

EXAMPLE 20

The system according to Example 17, wherein the processor performs a) to f) iteratively on successive neighbouring pairs of the video frames beginning in a first iteration wherein the first image corresponds to a left-most or right-most video camera in an array of the video cameras.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention.

What is claimed is:

1. A method of generating a panoramic video from a plurality of video feeds from a respectively corresponding plurality of video cameras, the method comprising:
   using a processor to define in computer memory, for each video feed, a three-dimensional (3D) surface modelling optical properties of the corresponding video camera absent lens distortion;
   for each video feed, using the processor to project corresponding calibration images onto the corresponding 3D surface to generate corrected calibration images corrected of lens distortion;
   using the processor to stitch the 3D surfaces based on the corrected calibration images; and
   using the processor to project video frames received in the video feeds onto the respective 3D surfaces to generate the panoramic video.

2. The method according to claim 1, wherein each 3D surface comprises a corresponding panel having a vertex mesh, and the processor modifies the vertex mesh based on intrinsic camera parameters distortion coefficients to generate a warped panel, wherein the processor projects the corresponding calibration images onto the corresponding warped panels to generate the corrected calibration images, and projects the video frames onto the corresponding warped panels to generate the panoramic video.

3. The method according to claim 2, wherein using the processor to project the video frames received in the video feeds onto the respective 3D surfaces to generate the panoramic video comprises using mipmapping to interpolate between vertices of the modified vertex mesh of the warped panels.

4. The method according to claim 1, wherein using the processor to stitch the corrected video frames comprises:
   for each 3D surface, using a display and a user interface to modify in the computer memory a position, orientation, and/or size of the 3D surface with reference to a predefined 3D frame of reference to overlap one or more neighbouring corrected calibration images in respective boundary areas.

5. The method according to claim 4 further comprising using the processor to blend the corrected calibration images in the boundary areas by modifying, in each boundary area, a transparency of a corresponding upper panel in the boundary area to blend the corresponding corrected calibration images in the boundary area.

6. The method according to claim 5, wherein the processor modifies the transparency of the corresponding upper panel in the boundary area by modifying an alpha channel of the corresponding upper panel in the boundary area.

7. The method according to claim 1, wherein the processor further normalizes a colour profile of the video frames to generate the panoramic video.

8. The method according to claim 7, wherein the processor normalizes the colour profile of the video frames by, for each neighbouring pair of the corrected calibration images comprising a first image and a second image overlapping in a boundary area:
   a) defining a reference region in the first image in the boundary area;
   b) defining a check region in the second image overlapping the reference region in the boundary area;
   c) calculating one or more reference region medians in the reference region;
   d) calculating one or more check region medians in the check region;
   e) calculating median differences associated with the second image based on the reference region medians and the check region medians; and
   f) based on the median differences, generating a difference texture associated with the 3D surface corresponding to the second image.

9. The method according to claim 8, wherein the processor normalizes the colour profile of the video frames by further, for each 3D surface, projecting the corresponding difference texture onto the 3D surface in addition to the video frames of the corresponding video feed.

10. The method according to claim 8, wherein for at least one corrected calibration image calculating the reference region medians comprises subtracting median differences associated with the corrected calibration image.

11. The method according to claim 8, wherein the reference region medians comprise respective medians of RGB colour channel values in the reference region, the check region medians comprise respective medians of RGB colour channel values in the check region, and e) comprises subtracting the medians of RGB colour channel values in the reference region from the respective medians of RGB colour channel values in check region.

12. The method according to claim 11, wherein the reference region medians comprise a median luminance value in the reference region, the check region medians comprise a median luminance value in the check region, and e) comprises subtracting the median luminance value in the reference region from the median luminance value in the check region.

13. The method according to claim 8, wherein a) to f) are performed iteratively on successive neighbouring pairs of the video frames beginning in a first iteration wherein the first image corresponds to a left-most or right-most video camera in an array of the video cameras.

14. A system for generating a panoramic video from a plurality of video feeds from a respectively corresponding plurality of video cameras, the system comprising a processor and a memory storing instructions executable by the processor:
   to define in computer memory, for each video feed, a three-dimensional (3D) surface modelling optical properties of the corresponding video camera absent lens distortion;
   for each video feed, to project corresponding calibration images onto the corresponding 3D surface to generate corrected calibration images corrected of lens distortion;
   to stitch the 3D surfaces based on the corrected calibration images; and
   to project video frames received in the video feeds onto the respective 3D surfaces to generate the panoramic video.

15. The system according to claim 14, wherein the system further comprises a display and a user interface connected to the processor and memory to stitch the 3D surfaces, wherein the display and the user interface are used to modify in the computer memory a position, orientation, and/or size of each 3D surface with reference to a predefined 3D frame of reference to overlap one or more neighbouring corrected calibration images in respective boundary areas.

16. The system according to claim 15, wherein the instructions are further executable by the processor:
   to blend the corrected calibration images in the boundary areas by modifying, in each boundary area, a transparency of a corresponding upper panel in the boundary area to blend the corresponding corrected calibration images in the boundary area.

17. The system according to claim 16, wherein the processor modifies the transparency of the corresponding upper panel in the boundary area by modifying an alpha channel of the corresponding upper panel in the boundary area.

18. The system according to claim 14, wherein the instructions are further executable by the processor to normalize colour profiles of the video frames, to generate the panoramic video, by, for each neighbouring pair of the corrected calibration images comprising a first image and a second image overlapping in a boundary area:
   a) defining a reference region in the first image in the boundary area;
   b) defining a check region in the second image overlapping the reference region in the boundary area;
   c) calculating one or more reference region medians in the reference region;
   d) calculating one or more check region medians in the check region;
   e) calculating median differences associated with the second image based on the reference region medians and the check region medians; and
   f) based on the median differences, generating a difference texture associated with the 3D surface corresponding to the second image.

19. The system according to claim 18, wherein the processor normalizes the colour profile of the video frames by further, for each 3D surface, projecting the corresponding difference texture onto the 3D surface in addition to the video frames of the corresponding video feed.

20. The system according to claim 18, wherein the reference region medians comprise respective medians of RGB colour channel values in the reference region, the check region medians comprise respective medians of RGB colour channel values in the check region, and e) comprises subtracting the medians of RGB colour channel values in the reference region from the respective medians of RGB colour channel values in check region.

21. The system according to claim 18, wherein the processor performs a) to f) iteratively on successive neighbouring pairs of the video frames beginning in a first iteration wherein the first image corresponds to a left-most or right-most video camera in an array of the video cameras.

* * * * *

UNITED STATES PATENT AND TRADEMARK OFFICE
CERTIFICATE OF CORRECTION

PATENT NO. : 10,666,862 B2
APPLICATION NO. : 15/120574
DATED : May 26, 2020
INVENTOR(S) : Christian Tim Thurow and Moodie Cheikh It is certified that error appears in the above-identified patent and that said Letters Patent is hereby corrected as shown below:

In the Claims

In Claim 2, Line 4 at Column 17, Line 21: Delete "intrinsic camera parameters distortion coefficients" and replace with "intrinsic camera parameters and distortion coefficients".

Signed and Sealed this
Twenty-sixth Day of July, 2022

Katherine Kelly Vidal
*Director of the United States Patent and Trademark Office*